(12) United States Patent
Rothhämel et al.

(10) Patent No.: US 11,554,762 B2
(45) Date of Patent: Jan. 17, 2023

(54) METHOD FOR PROVIDING VEHICLE STEERING SUPPORT BY DIFFERENTIAL WHEEL BRAKING, A SYSTEM, A VEHICLE, A COMPUTER PROGRAM AND A COMPUTER-READABLE MEDIUM

(71) Applicant: Scania CV AB, Södertälje (SE)

(72) Inventors: Malte Rothhämel, Huddinge (SE); Per Back, Stockholm (SE); Linus Flodin, Bromma (SE)

(73) Assignee: Scania CV AB, Södertälje (SE)

( * ) Notice: Subject to any disclaimer, the term of this patent is extended or adjusted under 35 U.S.C. 154(b) by 181 days.

(21) Appl. No.: 16/634,721

(22) PCT Filed: Aug. 20, 2018

(86) PCT No.: PCT/SE2018/050839
§ 371 (c)(1),
(2) Date: Jan. 28, 2020

(87) PCT Pub. No.: WO2019/045616
PCT Pub. Date: Mar. 7, 2019

(65) Prior Publication Data
US 2020/0216045 A1 Jul. 9, 2020

(30) Foreign Application Priority Data
Aug. 28, 2017 (SE) .................... 1751028-0

(51) Int. Cl.
*B60T 8/1755* (2006.01)
*B60W 10/184* (2012.01)
*B60W 10/20* (2006.01)

(52) U.S. Cl.
CPC ......... *B60T 8/1755* (2013.01); *B60W 10/184* (2013.01); *B60T 2270/402* (2013.01);
(Continued)

(58) Field of Classification Search
None
See application file for complete search history.

(56) References Cited

U.S. PATENT DOCUMENTS 5,469,928 A    11/1995  Adler et al.
6,026,926 A *  2/2000  Noro ............... B62D 5/0463
                                                 180/443
(Continued)

FOREIGN PATENT DOCUMENTS

CN    1315912 A    10/2001
CN    1439556 A    9/2003
(Continued)

OTHER PUBLICATIONS

Control Station, Common Industrial Applications of PI Control, Oct. 14, 2015, <https://controlstation.com/blog/pi-control/> (Year: 2015).*

(Continued)

*Primary Examiner* — Genna M Mott
(74) *Attorney, Agent, or Firm* — Moore & Van Allen PLLC; W. Kevin Ransom

(57) ABSTRACT

The invention relates to a method for providing vehicle steering support by differential wheel braking, the vehicle comprising: at least two axles with at least two wheels per axle; a braking system allowing individual braking of the wheels; and means for determining and/or estimating an operator input torque applied on a steering wheel, wherein the vehicle is configured with a positive scrub radius; the method comprising the steps of: identifying a need for steering support; determining a braking value required for achieving the needed steering support based on an integration of a function of at least one input value ($T_{input}$) related (Continued)

to a determined or estimated operator input torque; and controlling the braking system based on the determined braking value.

26 Claims, 5 Drawing Sheets

(52) U.S. Cl.
CPC ......... *B60W 10/20* (2013.01); *B60W 2520/10* (2013.01); *B60W 2540/18* (2013.01); *B60W 2710/18* (2013.01)

(56) References Cited

U.S. PATENT DOCUMENTS

| | | | |
|---|---|---|---|
| 6,600,974 | B1 | 7/2003 | Traechtler |
| 6,842,683 | B2 | 1/2005 | Kim |
| 7,246,670 | B2 | 7/2007 | Hayashi |
| 7,584,042 | B2 | 9/2009 | Suzumura |
| 8,380,399 | B2 | 2/2013 | Fujimoto |
| 2005/0209752 | A1 | 9/2005 | Ono et al. |
| 2005/0228568 | A1* | 10/2005 | Hack ................. B60T 8/322 701/70 |
| 2006/0069489 | A1* | 3/2006 | Chen .................. B60T 8/17554 701/70 |
| 2007/0294011 | A1 | 12/2007 | Yasui et al. |
| 2009/0026994 | A1* | 1/2009 | Namuduri ........... B62D 5/049 318/565 |
| 2009/0093928 | A1* | 4/2009 | Getman ............. B60T 8/1708 701/37 |
| 2010/0174442 | A1 | 7/2010 | Nishimori |
| 2012/0239255 | A1* | 9/2012 | Kojima ............. B62D 15/025 701/42 |
| 2016/0236679 | A1 | 8/2016 | Inoue et al. |
| 2016/0297439 | A1 | 10/2016 | Inoue et al. |
| 2016/0297478 | A1 | 10/2016 | Inoue et al. |
| 2016/0325721 | A1* | 11/2016 | Jonasson ............. B62D 6/003 |
| 2017/0113720 | A1* | 4/2017 | Kodera ............. B62D 5/0472 |

FOREIGN PATENT DOCUMENTS

| | | |
|---|---|---|
| CN | 1475390 A | 2/2004 |
| CN | 1611406 A | 5/2005 |
| CN | 1661235 A | 8/2005 |
| CN | 1695973 A | 11/2005 |
| CN | 1895921 A | 1/2007 |
| CN | 101298256 A | 11/2008 |
| CN | 101716951 A | 6/2010 |
| CN | 102232031 A | 11/2011 |
| CN | 105408190 A | 3/2016 |
| CN | 106218630 A | 12/2016 |
| DE | 4134240 C2 | 12/1995 |
| DE | 102008046007 A1 | 3/2010 |
| DE | 102016205523 A1 | 10/2016 |
| EP | 3020617 A1 | 5/2016 |
| GB | 2367543 A | 4/2002 |
| JP | H06135345 A | 5/1994 |
| JP | 2000190863 A | 7/2000 |
| JP | 2001247048 A | 9/2001 |
| JP | 2006193156 A * | 7/2006 |
| JP | 2012111286 A | 6/2012 |
| JP | 2013079003 A1 | 5/2013 |
| JP | 2016199115 A | 12/2016 |
| WO | 9308063 A1 | 4/1993 |

OTHER PUBLICATIONS

Scania CV AB, International Application No. PCT/SE2018/050839, International Search Report, dated Nov. 2, 2018.
Scania CV AB, International Application No. PCT/SE2018/050839, Written Opinion, dated Nov. 2, 2018.
Scania CV AB, Swedish Application No. 1751028-0, Office Action, dated Feb. 23, 2018.
Scania CV AB, Swedish Application No. 1751028-0, Office Action, dated Dec. 4, 2018.
Scania CV AB, International Application No. PCT/SE2018/050839, International Preliminary Report on Patentability, dated Mar. 3, 2020.
Scania CV AB, Korean Application No. 10-2020-7002054, Office Action, dated Dec. 14, 2020.
Scania CV AB, European Patent Application No. 18849782.0, Extended European Search Report, dated Apr. 21, 2021.
Scania CV AB, Chinese Patent Application No. 201880053731.9, First Office Action, dated Sep. 16, 2021.

* cited by examiner

Positive Second Input Value

Negative Second Input Value

METHOD FOR PROVIDING VEHICLE STEERING SUPPORT BY DIFFERENTIAL WHEEL BRAKING, A SYSTEM, A VEHICLE, A COMPUTER PROGRAM AND A COMPUTER-READABLE MEDIUM

CROSS-REFERENCE TO RELATED APPLICATIONS

This application is a national stage application (filed under 35 § U.S.C. 371) of PCT/SE2018/050839, filed Aug. 20, 2018 of the same title, which, in turn, claims priority to Swedish Application No. 1751028-0 filed Aug. 28, 2017; the contents of each of which are hereby incorporated by reference.

FIELD OF THE INVENTION

The present invention relates to a method for providing vehicle steering support by differential wheel braking, a system for providing vehicle steering support by differential wheel braking, a vehicle comprising such a system, a computer program and a computer-readable medium.

BACKGROUND OF THE INVENTION

Heavy vehicles, such as trucks, busses, construction vehicles etc. comprise a steering servomechanism assisting the operator of the vehicle when changing the steering angle by means of the steering wheel. This way, the large and heavy vehicle can easily be maneuvered by using the steering wheel. Without the servomechanism such heavy vehicles would be more or less impossible to steer. To ensure safety, legal requirements specify a maximum allowed steering wheel force to steer the vehicle in case of primary servomechanism failure. To fulfil this requirement some vehicles comprise a redundant steering aid system helping the driver to control the vehicle. Such steering aid system may comprise a second hydraulic circuit with a second hydraulic pump, for the event of failure in the hydraulics of the servomechanism. Other known solutions are to add a strong electric motor to the steering column, the electric motor supporting the driver in case of failure in the servomechanism. However, adding components to a vehicle requires extra space and it is often difficult to find this space on a vehicle.

An alternative way of providing steering support is disclosed in document DE 102008046007 A1. The document discloses steering force support provided by braking the inner wheels of the steered axle in the event of failure of the servomechanism. The braking is performed depending on the applied steering torque or as a function of the requested steering angle.

One problem with steering support by applying wheel brakes is the delay in building up brake pressure in the wheel brake cylinders. If the applied brake pressure corresponds to an applied steering torque the delay in building up brake pressure may make the process unstable. The instability is caused by the driver continuing to increase the steering torque until the brake force is applied on the wheel, whereby too much brake force is applied, the steering wheel moves significantly and the driver will apply a steering torque in the opposite direction. This way, oscillation occurs and hence the instability.

SUMMARY OF THE INVENTION

Despite known solutions in the field, it would be desirable to develop a method and system for providing vehicle steering support, which overcomes or at least alleviates the drawbacks mentioned above.

An object of the present invention is therefore to achieve a new and advantageous method and system for providing vehicle steering support, which enables efficient steering support redundancy without adding extra components and which enables allocating steering assistance to actuators according to predetermined preferences. Another object of the invention is to achieve a new and advantageous vehicle, computer program and computer-readable medium, which enable efficient steering redundancy without adding extra components and which enables allocating steering assistance to actuators according to predetermined preferences.

The herein mentioned objects are achieved by a method for providing vehicle steering support by differential wheel braking, a system for providing vehicle steering support by differential wheel braking, a vehicle, a computer program and a computer-readable medium according to the independent claims.

Hence, according to an aspect of the present invention a method for providing vehicle steering support by differential wheel braking is provided. The vehicle comprising: at least two axles with at least two wheels per axle; a braking system allowing individual braking of the wheels; and means for determining and/or estimating an operator input torque applied on a steering wheel, wherein the vehicle is configured with a positive scrub radius. The method comprising the steps of:
  identifying a need for steering support;
  determining a braking value for providing steering support, based on an integration of a function of at least one input value relating to a determined or estimated operator input torque; and
  controlling the braking system based on the determined braking value.

The vehicle being configured with a positive scrub radius means that the wheel suspension is configured such that one sided braking on a forward moving vehicle generates a torque turning the steering wheel in the direction of the wheel. Thus, when a braking force is applied on a wheel on the left side of the vehicle the wheel is turning to the left and a torque to the left is acting on the steering wheel. Similarly, when a braking force is applied on a wheel on the right side of the vehicle, the wheel is turning to the right and a torque to the right is acting on the steering wheel. The vehicle is thus configured, such that the king pin axis intersects the ground on the inner side of the centre of the wheel. The meaning of a scrub radius is considered to be common general knowledge and is not part of the invention per se. However, the positive scrub radius enables steering support by differential wheel braking.

By means of the function according to the invention the at least one input value is converted into a function value, which is subsequently integrated. Determining a braking value for providing steering support may comprise integrating a function of a first input value relating to a determined or estimated operator input torque. The first input value may thus be a determined operator input torque. The operator input torque is the torque applied on the steering wheel by the operator (driver) of the vehicle. The operator input torque indicates how much the operator wants to turn the vehicle and in what direction. The operator input torque thus indicates the desired steering angle. The input value relating to the determined operator input torque may thus be a positive or a negative value, where a positive value may indicate a steering torque to the left and a negative value may indicate a steering torque to the right. In one example the vehicle comprises an electronically assisted steering system used to improve the steering feeling and enabling control of the steering force regardless of the vehicle speed. Such electronically assisted steering system may comprise an electric motor generating torque to be added to the operator input torque, and sensor devices measuring the operator input torque and the steering angle. The applied motor torque depends on the applied operator input torque, such that when the operator increases the input torque the motor torque is also increased. The applied motor torque can thus be used as an estimation of the operator input torque. The first input value relating to an estimated operator input torque may thus be a determined motor torque. That is, the step of determining a braking value may comprise integration of a function of at least one input value, wherein the at least one input value is a determined operator input torque or a determined motor torque.

The function may differentiate between the amount/value of the at least one input value and the sign/direction (plus/minus) of the at least one input value. By integrating a function of at least one input value relating to the operator input torque, a controlled change rate of the braking value is achieved and a stable steering support is provided for all conditions such as friction, vehicle load, vehicle type and temperature.

The braking system of the vehicle suitably comprises wheel brakes, one arranged at each wheel of the vehicle. The braking system is suitably configured for allowing individual braking of the wheels, meaning that, for example, only the left wheel on a wheel axle can be braked while the right wheel is unbraked. The vehicle may have axles where individual wheel braking is not possible and braking of these axles will then not contribute to the steering support. The vehicle may comprise a specific interface adapted to allow individual braking of the wheels. The function of individual braking may thus be available in the vehicle but it may be activated via the interface.

The determined braking value suitably indicates on which side of the vehicle the braking value should be applied. The braking value may be a positive or negative value where a positive value may indicate that it should be applied on a left wheel and where a negative value may indicate that it should be applied on a right wheel. Alternatively, the value itself indicates on which side of the vehicle the braking value should be applied. For example, braking values between 1-100 could indicate that braking force should be applied on a left wheel and values between 101-200 could indicate that braking force should be applied on a right wheel. The determined braking value may be a percentage of a maximum brake pressure or it may be a brake pressure value. The maximum brake pressure is set by the braking system and is available in the vehicle. When the vehicle is reversing, brakes on steered axles are applied on the opposite side wheels to provide accurate steering support.

According to an embodiment of the invention the step of determining the braking value comprises a PI controller, wherein the integral term comprises integration of a function of a first input value relating to a determined or estimated operator input torque and a second input value correlated to a current braking value. It is commonly known that a PI controller is a control loop feedback mechanism calculating an error value and applying a correction based on a proportional term and an integral term. The error value according to the invention is the first input value. The control variable/output determined by means of the PI controller is the determined braking value. The braking value determined by means of the PI controller is the proportional term plus the integral term. Determining the braking value thus suitably also comprises determining a proportional term. The proportional term suitably comprises the first input value relating to a determined or estimated operator input torque and a proportional factor multiplied with the first input value. The proportional term may thus comprise a determined operator input torque and a proportional factor or a determined motor torque and a proportional factor. The proportional factor may be speed dependent. The proportional factor may be between 0-25 if the first input value is normalized to be in the range of −1 to +1. The integration value is the sum of the error value over time and thus gives an accumulated offset. As mentioned in relation to the prior art, it takes time to build up a brake pressure in the wheel brakes. However, when an operator input torque is applied in the opposite direction compared to the current steering direction it is desired to decrease the brake pressure at a faster rate in the wheel brakes that should no longer be activated. When the steering support according to the invention first is activated the current braking value and thus the second input signal is substantially zero but as the operator turns the steering wheel the brake pressure starts to build up in the activated wheel brakes and the absolute value of the second input value will increase. Thus, the second input value will relatively quickly have an absolute value higher than zero. The second input value will thus indicate the current brake pressure. By including the second input value correlated to the current braking value into the function that will be integrated, the applied operator input torque or motor torque can be compared with the current brake pressure and the function can be adapted to achieve a desired increase/decrease of brake pressure. This way, an efficient and accurate steering support is achieved. The second input value correlated to the current braking value may be the output determined by the PI controller, i.e. the current braking value. The second input value may alternatively be the integral term, or the second input value may be the integral term plus the proportional term.

The integral term may further comprise an integral factor (gain) multiplied with the integral of the function. The integral factor is suitably speed dependant. The step of determining the braking value may thus comprise to determine an integral factor based on the current vehicle speed. With a high integral factor a fast responding steering support is achieved but the risk for instability it also increased. However, at low vehicle speeds the vehicle does not respond the same way due to the low acceleration (F=a*m). This means that a higher integral factor can be used at lower vehicle speeds without risking instability. The integral factor may increase linearly with decreasing vehicle speed, for vehicle speeds below 15 km/h, preferably below 10 km/h. The integral factor may increase linearly when the vehicle speed decreases from 10 km/h to 0 km/h.

According to an embodiment of the invention the function that will be integrated depends on the value and/or the direction of the first input value in relation to the second input value. The step of determining the braking value may thus comprise to determine a function value based on the value and/or direction of the first input value and the second input value. The direction/sign of the first input value is suitably compared with the sign of the second input value that represents the current braking value. The sign of the second input value indicates the side on which the wheel braking force is applied. The value of the first input value is suitably also compared with predetermined threshold values.

According to one example, when the first input value has the same sign (direction) as the second input value, the function is set to a first value when the absolute value of the first input value is below a first threshold value, the function is set to a second value when the absolute value of the first input value is between the first threshold value and a second threshold value, the absolute value of the function increases between the second value to a third value when the absolute value of the first input signal value is between the second threshold value and a third threshold value, and the function is set to a fourth value when the absolute value of the first input value exceeds the third threshold value. The absolute value of the fourth value is suitably significantly higher than the absolute value of the third value. This way, a brake pressure can rapidly be built up when the absolute value of the operator input torque exceeds the third threshold value. The third threshold value may correspond to a value just below a measurement range for the means for determining the operator input torque. Today, torque sensors are typically limited to being able to measure torque up to around 11 Nm. By setting a significantly higher absolute function value when the first input value is outside the measurement range it is ensured that the braking value is determined to achieve the needed steering support. The second threshold value is suitably higher than the first threshold value, and the third threshold value is suitably higher than the second value. The first function value suitably has a different sign than the first input value. This way, the steering wheel will return to a mid-position when the operator lets go of the steering wheel. The first input value having the same sign as the second input value and thus the current braking value means that the operator is applying a torque in the same direction as the vehicle is currently turned. That is, the vehicle is turned and braked in the same desired direction. Suitably the function is set to a fifth value, with absolute value significantly higher than other function values and with the same sign as the first input value, when the sign of the first input value is opposite to the sign of the second input value. This way, the brake pressure of the currently activated wheel brakes can rapidly be decreased and steering support to the desired direction can thereby be provided faster. When the first input value and the second input value have different signs the operator desires to turn the vehicle in an opposite direction and wheel brakes on the other side of the vehicle should eventually be actuated. By using different function values depending on the value and sign of the first input value and the second input value (current braking value), the determined braking value is accurately adapted to the current conditions and a very responsive system is achieved. This is an example for situations where the steering angles to the left and right are represented with different signs (plus/minus). It is, however, to be understood that the function would work conversely for cases when angles are represented in other ways.

According to an embodiment of the invention the need for steering support is determined based on the at least one input value relating to a determined or estimated operator input torque. The steering support according to the invention is suitably only provided when there is an actual need for it. That is, the steering support is only activated when a need for steering support has been identified. Thus, the steps of determining a braking value and controlling the braking system are only performed when a need for steering support has been identified. A need for steering support may exist when there is a failure in a servomechanism of the vehicle or when there is a failure in another steering aid system in the vehicle. The step of identifying a need for steering support may thus comprise to identify a faulty servomechanism or another faulty steering aid system. The operator input torque may indicate if there is a need for steering support since the operator typically is required to apply more torque when there is something wrong with the steering aid systems. Thus, a need for steering support may be identified based on a determined operator input torque. The operator input torque may be determined by means of a torque sensor measuring the applied operator input torque or it may be determined based on other parameters relating to the steering system of the vehicle. In the example mentioned above where the vehicle comprises an electronically assisted steering system, a need for steering support may be identified based on a determined motor torque applied by the electric motor of the electronically assisted steering system. The electronically assisted steering system may be configured to identify problems with the servomechanism and identifying a need for steering support may thus comprise identifying a fault signal from the electronically assisted steering system indicating failure in the servomechanism. Thus, input to identifying a need for steering support may be a measured operator input torque, a measured motor torque or a fault signal from the electronically assisted steering system. A need for steering support may thereby be identified based on a measured operator input torque, a measured motor torque and/or a faulty signal indicating failure with another steering aid system. According to an example identifying a need for steering support comprises controlling that a measured operator input torque and a measured motor torque are consistent with each other.

According to an embodiment of the invention identifying a need for steering support may comprise to determine if the operator input torque or motor torque has exceeded a predetermined maximum torque value during a predetermined time. The logic in the vehicle knows the operator input torque/motor torque required to steer the vehicle. Thus, when the operator input torque/motor torque has exceeded the predetermined maximum torque value for a certain period in time it can be concluded that something is wrong with a steering aid system (for example the servomechanism).

According to an embodiment of the invention a need for steering support requires a current vehicle speed above 7 km/h. Suitably, the step of identifying a need for steering support comprises to determine that the operator input torque or motor torque has exceeded a predetermined maximum torque value during a predetermined time, at a vehicle speed above 7 km/h. That is, the step of identifying a need for steering support may comprise to determine that the vehicle speed is above 7 km/h. If the vehicle speed is lower than 7 km/h no steering support will be provided. At vehicle speeds lower than 7 km/h the applied operator input torque may be high due to driving into bumps, holes or against obstacles, so the wheels might not be possible to turn. Turning at such low speeds is not safety critical as the operator can stop the vehicle in a short distance by normal symmetrical braking. As an alternative, a need for steering support is only identified if the current vehicle speed is above 3 km/h.

According to an embodiment of the invention the method further comprises to determine if the difference between the current wheel angle and a wheel angle defining a wheel position in parallel with the longitudinal extension of the vehicle is smaller than a predetermined angle value. A wheel angle defining a wheel position in parallel with the longitudinal extension of the vehicle may be referred to as a zero angle. If the difference is larger than the predetermined angle value and the operator wants to turn the wheels further in the same direction, the steering support will be interrupted. Suitably, if the current wheel angle is close to the maximum wheel angle and the operator intends to turn the wheels further in the same direction, the steering aid will not support that. The maximum wheel angle is the largest possible wheel angle. This way, the risk for damaging mechanical components of the wheel suspension is reduced. The predetermined angle value may be 5-10% smaller than the difference between the maximum wheel angle and the zero angle. If the difference is smaller than the predetermined angle value, steering support is provided.

According to an embodiment of the invention the method further comprises to determine distribution of the braking value between the vehicle wheels. The determined braking value is a braking value required to provide the desired steering support indicated by the determined or estimated operator input torque. There are, however, certain internal and external factors affecting how the braking value should be applied in order to provide the best steering support. Suitably, the braking value is intended for a wheel on a steered axle. Thus, the method may comprise to determine distribution of the braking value between the wheels of the steered axles of the vehicle. By steered axles means axles mechanically linked to the steering wheel. The vehicle may comprise two or more steered front axles and in that case the braking value may be distributed between the steered front axles. Steering torque can, however, also be generated by braking wheels of a rigid axle (not steered axle). Therefore the method comprises the step of determining the distribution of the braking value between mechanically steered and not steered axles of the vehicle.

According to an embodiment of the invention the distribution may be determined based on the configuration of the brake system; the current vehicle speed and/or if the determined braking value is similar to a maximum brake pressure. For example, the braking value may not be distributed to axles having easily overheated wheel brake components. Also the vehicle speed can be important to consider when determining the distribution of the braking value. For example, at low vehicle speeds harder braking is needed for steering and the risk for wheel lockup increases and the braking value may therefore be distributed between all steered axles. Suitably, the braking value is evenly distributed to all steered axles when the vehicle speed is below 3 km/h. At vehicle speeds above 8 km/h the braking value may be distributed taking the easily overheated components into consideration. The distribution of the braking value suitably changes gradually between 3 km/h and 8 km/h. If the determined braking value is close to a maximum brake pressure also the rear (rigid) axles may be braked. Suitably, it may be determined if the determined braking value exceeds a predetermined brake pressure threshold value. If the braking value exceeds the brake pressure threshold value, also the rigid rear axles are braked. The predetermined brake pressure threshold value may be between 80-90% of the maximum brake pressure. This way, it is ensured that the desired steering support is provided.

The step of determining distribution of the braking value may also comprise a speed dependent amplifier. The determined braking value may thus be multiplied with an amplifier factor, wherein the maximum value of the amplifier factor is 1. At low vehicle speeds more steering support is needed in order to turn the vehicle. However, at vehicle speeds below 6 km/h the amplifier factor may be linearly decreased towards 0 in order to avoid that the applied brake pressure (steering support) prevents the vehicle from moving forward. At vehicle speeds above 50 km/h steering support by means for differential braking may affect the safety of the vehicle and therefore the amplifier factor is set to a lower value, for example between 0.50 to 0.65. At vehicle speeds between 6-20 km/h the amplifier factor is suitably 1. Between 20 km/h to 50 km/h the amplifier factor is suitably linearly decreased.

According to an embodiment of the invention determining the distribution of the braking value comprises a scale factor for reducing the braking value adapted for left wheels on left-hand driven vehicles and for reducing the braking value adapted for right wheels on right-hand driven vehicles. Vehicles are not symmetrically configured and a left-hand driven vehicle may have less mechanical linkage between the steering wheel and the left wheels than to the right wheels while a right-hand driven vehicle may have less mechanical linkage between the steering wheel and the right wheels than to the left wheels. Thus, if a left wheel is braked on a left-hand driven vehicle it may have a greater impact on the steering wheel than if a right wheel is braked (left oversteered). Therefore, for achieving a more symmetrical behaviour a scale factor may be used. The scale factor may be between 75-95%, meaning that on a left oversteered vehicle the left wheels will only be braked with 75-95% of the determined braking value and on a right oversteered vehicle the right wheels will only be braked with 75-95% of the determined braking value. According to an alternative embodiment of the invention determining the distribution of the braking value comprises a scale factor for reducing the braking value such that the wheels that are more easily steered get a lower braking value.

According to an embodiment of the invention the distributed braking value controlling the braking system is set to zero if the absolute value of the determined braking value is lower than a minimum threshold value. Thus, the at least one control signal may be set to zero, such that no braking is performed, when the absolute value of the determined braking value is lower than a minimum threshold value. The minimum threshold value may be around 10% of the maximum brake pressure. By preventing braking, and thus steering support, when the determined braking value is very small unnecessary load on the braking system is avoided.

The result/output of the step of determining the distribution of the determined braking value is an at least one control signal comprising a distributed braking value for controlling the braking system. The at least one control signal suitably indicates the braking force/brake pressure to be applied and on which side of the vehicle. At least one control signal may be adapted for each axle of the vehicle. Alternatively, at least one control signal is adapted for each wheel. The step of controlling the braking system based on the determined braking value may thus comprise to send at least one control signal comprising the distributed braking value to the braking system. The at least one control signal may be sent to the braking system via a specific interface allowing individual braking of the wheels.

Suitably, the step of determining the distribution of the determined braking value comprises to receive the determined braking value; based on the vehicle speed determine how the braking value should be distributed between the wheel axles; multiply the determined braking values for the axles with a speed dependent amplifier factor; multiply the amplified value with a left/right symmetry scale factor; and determine if the distributed braking value is higher than a minimum threshold value. The distributed braking value can thereafter be sent to the braking system.

According to an embodiment of the invention the braking system is controlled based on the determined braking value and the current vehicle speed. For example, the control signal may be interpreted differently by the braking system depending on the vehicle speed or the control signal is adjusted depending on the vehicle speed before being transferred to the braking system.

The method may further comprise to inform the operator of the vehicle about the provided steering support. The information to the operator may be provided via an information cluster. The information may be in the form of an audial alert, visual alert on a display or a haptic alert.

The method may also comprise to limit the driveline torque of the vehicle when a need for steering support has been identified. Suitably, the method comprises to limit the vehicle speed when a need for steering support has been identified. The method may also add symmetrical braking of the vehicle to reduce speed when a need for steering support has been identified.

According to an aspect of the invention a system for providing vehicle steering support by differential wheel braking in a vehicle is provided. The vehicle comprising at least two axles with at least two wheels per axle and being configured with a positive scrub radius, wherein the system is arranged in communication with a braking system of the vehicle, the braking system allowing braking of individual wheels on the axles, and wherein the system is arranged in communication with means for determining and/or estimating an operator input torque applied on a steering wheel. The system comprises:

means for identifying a need for steering support;
means for determining a braking value for providing steering support based on an integration of a function of at least one input value related to a determined or estimated operator input torque; and
means for controlling the braking system based on the determined braking value.

It will be appreciated that all the embodiments described for the method aspect of the invention are also applicable to the system aspect of the invention. That is, the system may be configured to perform any one of the steps of the method according to various embodiments described herein.

The system is a vehicle-mountable system and suitably comprises a control unit adapted to perform the method steps described herein. The means for identifying a need for steering support; the means for determining a braking value based on an integration of a function of at least one input value related to a determined or estimated operator input torque; and the means for controlling the braking system based on the determined braking value, may e.g. be different software modules/portions in a control unit, program code or similar.

The means for determining the braking value may comprise a PI controller, wherein the integral term comprises integration of a function of a first input value relating to a determined or estimated operator input torque and a second input value correlated to a current braking value. The PI controller is configured as has been disclosed above with regard to the method aspect of the invention.

According to an embodiment of the invention the system further comprises at least one interface for communication with the braking system. The at least one interface may thus be arranged between the control unit and the braking system. Individual braking of the wheels is suitably allowed only via the interface. The function of individual braking may thus be available in the vehicle but can only be activated via the interface. The means for controlling the braking system may thus comprise the interface.

According to an embodiment of the invention the system further comprises means for determining distribution of the braking value between the vehicle wheels. The means for determining distribution of the braking value may be adapted to transfer at least one control signal comprising the distributed braking value to the braking system.

According to an embodiment of the invention the system is arranged in communication with an instrument cluster, wherein the system is adapted to inform the operator of the vehicle about the provided steering support via the instrument cluster. This way, an alert is provided so that the operator is aware of the failure of the steering aid system and can operate the vehicle to a safe stop.

According to an embodiment of the invention the system is arranged in communication with a transmission management system, wherein the system is adapted to ensure that the driveline torque is limited via the transmission management system, when the need for steering support has been identified. The system may thus be adapted to request driveline torque limitation in the transmission management system. This way, the vehicle speed will be reduced when the need for steering support is identified and safety is increased. The system may also be adapted to activate symmetrical braking in order to reduce the speed of the vehicle when a need for steering support has been identified.

Further objects, advantages and novel features of the present invention will become apparent to one skilled in the art from the following details, and also by putting the invention into practice. Whereas embodiments of the invention are described below, it should be noted that it is not restricted to the specific details described. Specialists having access to the teachings herein will recognise further applications, modifications and incorporations within other fields, which are within the scope of the invention.

BRIEF DESCRIPTION OF THE DRAWINGS

For fuller understanding of the present invention and further objects and advantages of it, the detailed description set out below should be read together with the accompanying drawings, in which the same reference notations denote similar items in the various diagrams, and in which.

DETAILED DESCRIPTION OF THE INVENTION

The term "link" refers herein to a communication link which may be a physical connection such as an opto-electronic communication line, or a non-physical connection such as a wireless connection, e.g. a radio link or microwave link.

Figure 1:
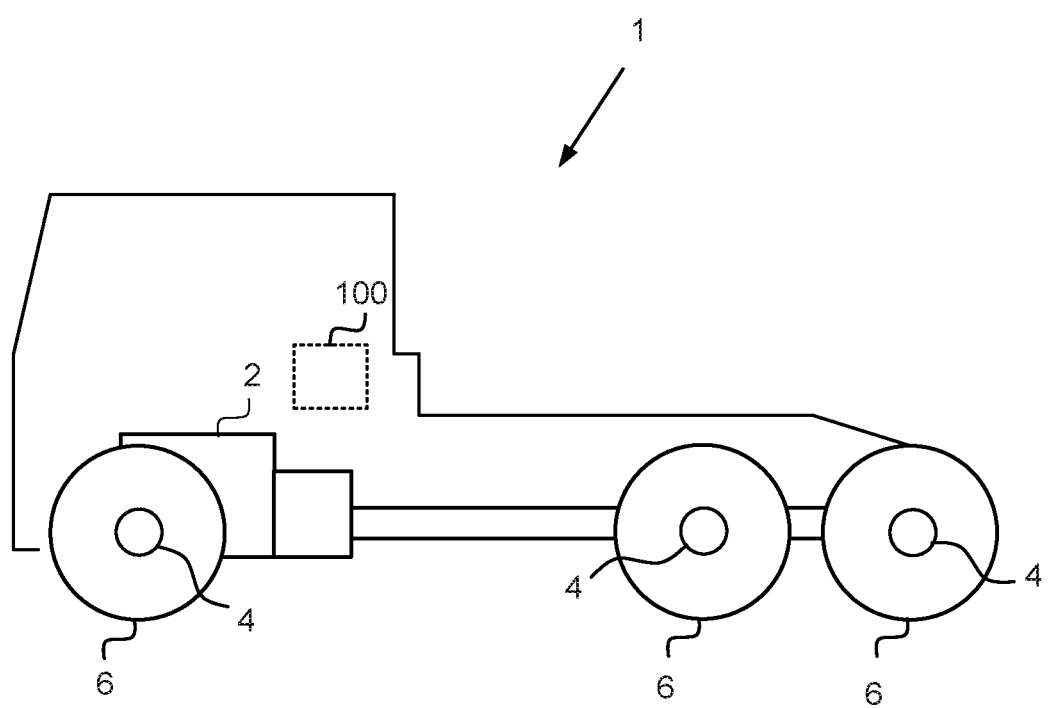
FIG. 1 schematically illustrates a vehicle according to an embodiment of the invention.

FIG. 1 schematically shows a side view of a vehicle 1 comprising a vehicle-mountable system 100 for providing steering support by differential wheel braking according to an embodiment of the invention. The vehicle 1 comprises a propulsion unit 2. The vehicle 1 may be a hybrid vehicle, an electrical vehicle or a vehicle driven by a combustion engine, and the propulsion unit 2 may thus be a combustion engine or an electric motor. The vehicle 1 comprises at least two wheel axles 4 with at least two wheels 6 per axle. In this figure the vehicle 1 comprises one front axle and two rear axle, where the front axle may be a steered axle. The vehicle 1 may, however, comprise two or more front axles 4, which may all be steered axles. The vehicle 1 comprises a braking system (not shown) allowing individual braking of the wheels 6. The braking system thus comprises individually controlled wheels brakes arranged at each wheel 6. The vehicle 1 is configured with a positive scrub radius, such that steering support can be provided by braking the wheels 6. The vehicle 1 may be a heavy vehicle, e.g. a truck or a bus.

Figure 2:
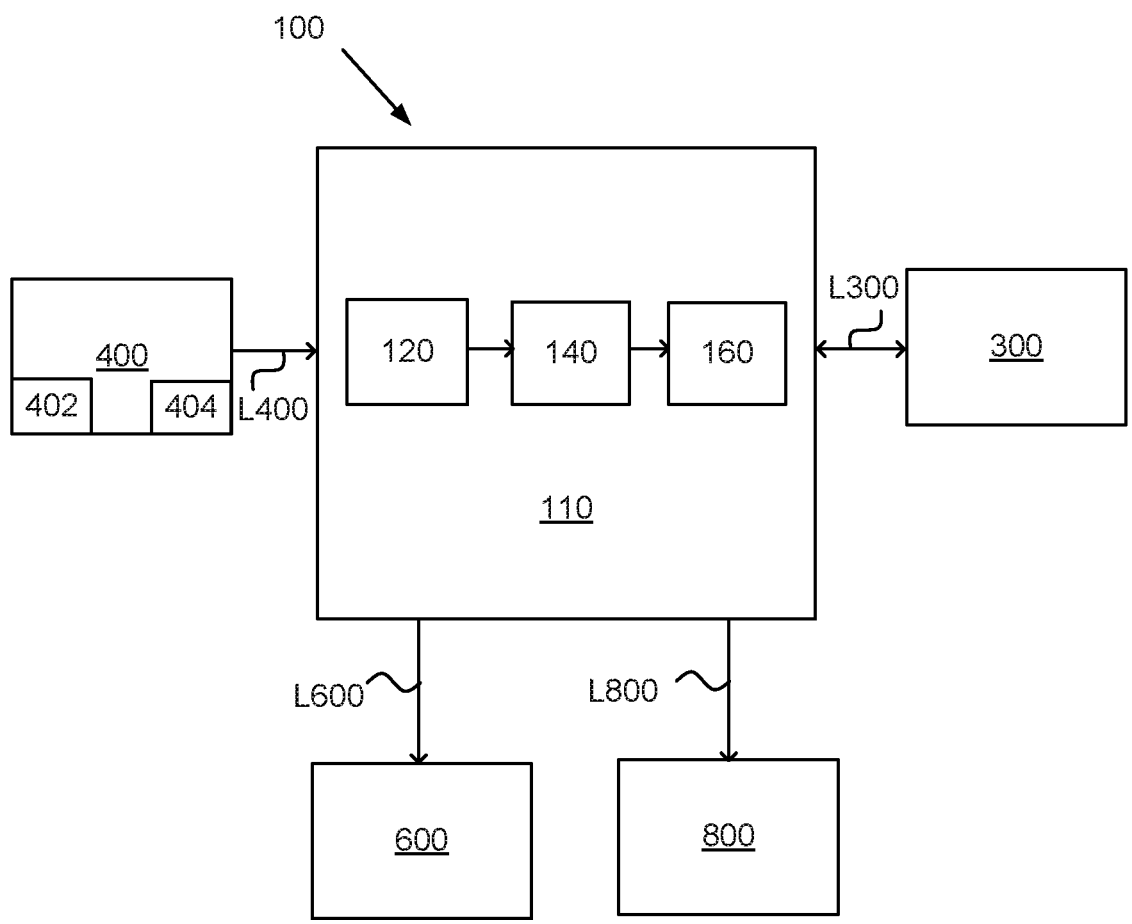
FIG. 2 schematically illustrates a system according to an embodiment of the invention.

FIG. 2 schematically shows a vehicle-mountable system 100 for providing vehicle steering support by differential wheel braking according to an embodiment of the invention. The vehicle may be the vehicle 1 as disclosed in FIG. 1. The system 100 is arranged in communication with a braking system 300 of the vehicle 1, the braking system 300 allowing individual braking of the wheels 6. The system 100 is also arranged in communication with means 400 for determining and/or estimating an operator input torque applied on a steering wheel. The system 100 comprises: means for identifying a need for steering support; means for determining a braking value, for providing steering support, based on an integration of a function of at least one input value relating to a determined or estimated operator input torque; and means for controlling the braking system 300 based on the determined braking value. It is to be understood that by steering support is meant steering assistance in the form of additional steering torque to turn the vehicle 1.

The means 400 for determining and/or estimating an operator input torque communicates with the system 100 via a link L400. The braking system 300 communicates with the system 100 via link L300.

The system 100 suitably comprises a control unit 110 adapted to identify a need for steering support, to determine a braking value for providing steering support based on an integration of a function of at least one input value relating to a determined or estimated operator input torque, and to control the braking system 300 based on the determined braking value. The means for identifying a need for steering support; the means for determining a braking value based on an integration of a function of at least one input value relating to a determined or estimated operator input torque; and the means for controlling the braking system based on the determined braking value may be different software modules/portions in the control unit 110, which will be further described below.

The control unit 110 suitably comprises an activation module 120, a regulation module 140 and a distribution module 160. In one embodiment the activation module 120 is a hardware arranged in communication with the control unit 110.

The activation module 120 may be adapted to determine if steering support by differential wheel braking should be provided or not. The activation module 120 may be adapted to activate the steering support function if a need for steering support has been identified. The activation module 120 may be adapted to identify a need for steering support and may thus constitute at least a part of the means for identifying a need for steering support. The activation module 120 is suitably adapted to identify a need for steering support only if there is a failure in a servomechanism or another steering aid system of the vehicle 1. The activation module 120 may thus be adapted to identify a faulty servomechanism or other steering aid system. A faulty steering aid system may be identified based on the operator input torque. When there is something wrong with the steering aid system the operator typically is required to apply more torque to turn the vehicle 1. An unnaturally high operator input torque may thus indicate a faulty steering aid system and thus a need for steering support. According to an example the activation module 120 is adapted to determine if the operator input torque has exceeded a predetermined maximum torque value during a predetermined time, suitably at a vehicle speed above 7 km/h. The predetermined maximum torque may be slightly higher than the torque required to steer the vehicle 1 under normal conditions, when the steering aid is functioning. Thus, when the operator input torque has exceeded the predetermined maximum torque value for a certain period in time it can be concluded that something is wrong with a steering aid system. The activation module 120 may thereby be adapted to identify a need for steering support based on signals from the means 400 for determining and/or estimating the operator input torque. The means 400 for determining and/or estimating the operator input torque may comprise a torque sensor 402 and/or an electronically assisted steering system 404 used to improve the steering feeling in the vehicle 1.

The electronically assisted steering system 404 may comprise an electric motor generating torque to be added to the operator input torque, and sensor devices measuring the operator input torque and the steering angle. The applied motor torque depends on the applied operator input torque. The applied motor torque can thus be referred to as an estimated operator input torque, which can be used to identify a need for steering support. The electronically assisted steering system 404 may be configured to be able to identify problems with the servomechanism and the activation module 120 may be adapted to identify a fault signal from the electronically assisted steering system 404. Thus, input signals to the activation module 120 for identifying a need for steering support may comprise a measured operator input torque, a measured motor torque and/or a fault signal from the electronically assisted steering system 404 and/or a fault signal from a separate hardware. Information from the torque sensor 402 and/or the electronically assisted steering system 404 is suitably available on a CAN bus in the vehicle, whereby the system 100/activation module 120 may receive the input signals via the CAN bus. The activation module 120 may be adapted to send an activation signal to the regulation module 140 when a need for steering support has been identified.

The regulation module 140 may be adapted to receive an activation signal from the activation module 120 indicating that it is safe to provide steering support. The input signal to the regulation module 140 may be a determined operator input torque or a determined applied motor torque. The regulation module 140 may be adapted to perform normalization of the input signal such that it has a value between −1 to +1, the sign of the value indicating the direction of the torque.

The regulation module 140 may further be adapted to determine the braking value required for providing steering support, based on an integration of a function of at least one input value relating to the determined or estimated operator input torque. Suitably, the regulation module 140 comprises a PI controller, wherein the integral term comprises integration of a function of a first input value relating to a determined or estimated operator input torque and a second input value correlated to a current braking value. The regulation module 140 is thus adapted to determine the braking value based on an integration of a function of a first input value relating to a determined or estimated operator input torque and a second input value correlated to a current braking value. The first input value to the integral term is thus suitably the normalized input signal. The error value in the PI controller according to the invention is the first input value. The control variable/output signal from the PI controller and thus the regulation module 140 is the determined braking value, which may be a brake pressure value or a percentage of a maximum brake pressure.

The regulation module 140 may be adapted to determine a proportional term and an integral term. The regulation module 140 may be adapted to determine the proportional term based on the determined or estimated operator input torque (first input signal). The proportional term further comprises a proportional factor multiplied with the input signal (operator input torque or motor torque). The proportional factor may be speed dependent.

The regulation module 140 is further adapted to determine a function of the first input value differentiating between the sign and the value of the first input value. The function also comprises the second input value correlated to the current braking value. The second input value indicates the current brake pressure in the wheel brakes. The regulation module 140 is adapted to perform the integration of the function. The integral term further comprises an integral factor (gain) multiplied with the integral of the function. The integral factor is suitably speed dependant. The regulation module 140 may thus be adapted to determine a higher integral factor at lower vehicle speeds. The integral factor determined by the regulation module 140 may increase linearly with decreasing vehicle speed, for vehicle speeds below 15 km/h, preferably below 10 km/h.

The regulation module 140 may further be adapted to determine the function based on the value and/or direction of the first input value. The regulation module 140 may be adapted to compare the sign of the first input value with the sign of the second input value. The first input value may also be compared with certain predetermined threshold values. This is further described in relation to FIG. 4.

The regulation module 140 is adapted to determine the braking value by adding the proportional term and the integral term. The determined braking value suitably indicates on which side of the vehicle the braking value should be applied. The regulation module 140 may also comprise a limiting function for limiting the braking value and the integral of the function, for example to a value between −100 to +100. In this case, the braking value is a percentage of a maximum brake pressure and a negative value indicates that the brake pressure should be applied on a right wheel 6 and a positive value indicates that the brake pressure should be applied on a left wheel 6. The braking value may, however, be an actual brake pressure value.

The output from the regulation module 140 is a single value, which is sent to the distribution module 160. The distribution module 160 is adapted to receive the determined braking value from the regulation module 140 and to determine the distribution of the braking value between the wheels 6 of the vehicle 1.

The distribution module 160 may be adapted to determine the distribution based on the configuration of the brake system 300; the current vehicle speed and/or if the determined braking value is close to a maximum brake pressure. For example, some wheel brake components on certain axles 4 may easily get overheated when used for a long time. The distribution module 160 may therefore determine not to distribute any brake pressure to such axle 4 under certain conditions. As an example, in a vehicle 1 with two steered front axles 4, if the determined braking value is 25% the braking value could be distributed, such that both steered axles 4 are braked with a brake pressure of 25% of the maximum brake pressure. However, taking the overheating factor into consideration the distribution module 160 may determine to not brake the easily overheated axle 4 but instead determine that the other steered axle 4 is braked with 50% of the maximum brake pressure. Also the vehicle speed can be important to consider when determining the distribution of the braking value. At low vehicle speeds the risk for wheel lockup is increased and therefore the distribution module 160 may be adapted to distribute the braking value evenly between both/all front steered axles 4 at low vehicle speeds. For example, at vehicle speeds below 3 km/h the braking value may be evenly distributed between the steered axles. At vehicle speeds above 8 km/h there is less risk of wheel lockup and the distribution can therefore be made to only some of the steered axles to minimize the overheating. If the determined braking value is close to a maximum brake pressure also the rear (rigid) axles 4 may be braked. Suitably, the distribution module 160 determines if the determined braking value exceeds a predetermined brake pressure threshold value. If the braking value exceeds the brake pressure threshold value, also the rear axles 4 are braked. The predetermined brake pressure threshold value may be between 80-90% of the maximum brake pressure. This way, extra steering support is provided.

The distribution module 160 may also be adapted to multiply the determined braking value with a speed dependent amplifier factor, wherein the maximum value of the amplifier factor is 1. At low vehicle speeds more steering support is needed in order to turn the vehicle 1. However, at vehicle speeds below 6 km/h the amplifier factor may be linearly decreased towards 0 in order to avoid that the applied brake pressure (steering support) prevents the vehicle 1 from moving forward. At vehicle speeds between 6-20 km/h the amplifier factor is suitably 1. At vehicle speeds above 50 km/h steering support by differential braking may affect the safety of the vehicle 1 and therefore the amplifier factor may be set to a lower value, for example between 0.50 and 0.65. Between 20 km/h to 50 km/h the amplifier factor is suitably linearly decreased.

The distribution module 160 may also be adapted to determine the distribution of the braking value based on a scale factor for reducing the braking value adapted for the left side of the vehicle for vehicles where braking the left wheel has a greater steering impact than braking the right wheel (left oversteered) and for reducing the braking value adapted for the right side of the vehicle for vehicles where braking the right wheel has a greater steering impact than braking the left wheel (right oversteered). The scale factor may be between 75-95%. Thus, in a left oversteered vehicle, the distribution module 160 is adapted to multiply the determined braking value adapted for a left wheel 6 with the scale factor to achieve the brake pressure, and in a right oversteered vehicle the distribution module 160 is adapted to multiply the determined braking value adapted for a right wheel 6 with the scale factor.

The output from the distribution module 160 is at least one control signal comprising a distributed braking value for controlling the braking system 300. The at least one control signal suitably indicates the braking force/brake pressure to be applied and on which side of the vehicle 1. The distribution module 160 may be adapted to generate one control signal per axle 4, wherein the signal itself indicates on which side the brake pressure should be applied. Alternatively, the distribution module 160 is adapted to generate one control signal per wheel 6. The braking system 300 may be controlled based on the control signal (distributed braking value) and the current vehicle speed. According to one example the distribution module 160 is adapted to determine the control signal based on the current vehicle speed. Alternatively, the braking system 300 is configured to interpret the control signal from the distribution module 160 differently depending on the current vehicle speed.

The distribution module 160 may be adapted to set the distributed braking value to zero if the absolute value of the determined braking value is lower than a minimum threshold value. Thus, the distribution module 160 may set the at least one control signal to zero, such that no braking is performed, when the absolute value of the determined braking value is lower than a minimum threshold value. The minimum threshold value may be around 10% of the maximum brake pressure.

The system 100 may further comprise at least one interface (not shown) for communication with the braking system 300. The at least one interface may thus be arranged between the control unit 110 and the braking system 300. The distribution module 160 may be adapted to send the at least one control signal to the braking system 300 via the at least one interface. Individual braking of the wheels 6 may be allowed only via the interface.

The system 100 is suitably arranged in communication with an instrument cluster 600 in the vehicle 1. The system 100 may be arranged to communicate with the instrument cluster 600 via a link L600. The system 100 may be adapted to inform the operator of the vehicle 1 about the provided steering support via the instrument cluster 600. The system 100 may be adapted to provide an audial alert, a visual alert or a haptic alert via the instrument cluster 600.

The system 100 may further be arranged in communication with a transmission management system 800. The system 100 may be arranged to communicate with the transmission management system 800 via a link L800. The system 100 may be adapted to ensure that the driveline torque in the vehicle 1 is limited via the transmission management system 800, when a need for steering support has been identified. Thus, the system 100 may be adapted to limit the vehicle speed when steering support is provided, to increase the safety. The system 100 may also be adapted to activate symmetrical braking in order to reduce the speed of the vehicle 1 when a need for steering support has been identified. The vehicle speed may be gradually limited to around 40 km/h when the steering support is provided.

Figure 3:
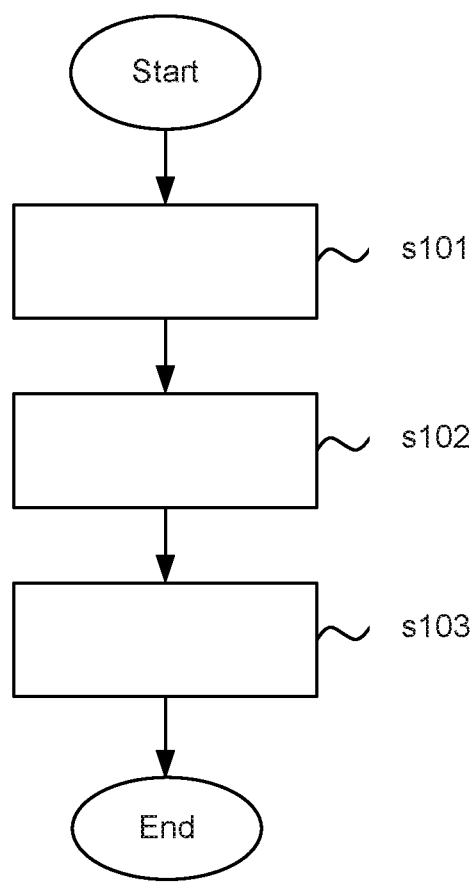
FIG. 3 illustrates a flow chart for a method for providing steering support according to an embodiment of the invention.

FIG. 3 illustrates a flow chart for a method for providing vehicle steering support by differential wheel braking according to an embodiment of the invention. The method is performed on a vehicle 1 as disclosed in FIG. 1. The vehicle 1 thus comprises at least two axles 4 with at least two wheels 6 per axle 4, a braking system 300 allowing individual braking of the wheels 6 and means 400 for determining and/or estimating an operator input torque applied on a steering wheel. The vehicle 1 is also configured with a positive scrub radius. The method is suitably performed by a system 100 as disclosed in FIG. 2. The method comprising the steps of: identifying s101 a need for steering support; determining s102 a braking value for providing steering support, based on an integration of a function of at least one input value relating to a determined or estimated operator input torque; and controlling s103 the braking system 300 based on the determined braking value.

The step of determining s102 the braking value may comprise a PI controller, wherein the integral term comprises integration of a function of a first input value relating to a determined or estimated operator input torque and a second input value correlated to a current braking value. The braking value is thus determined s102 based on an integration of a function of the operator input torque or applied motor torque, and a second input value correlated to a current braking value. Determining s102 the braking value suitably also comprises determining a proportional term. The proportional term comprises the operator input torque or the applied motor torque and a proportional factor. The proportional factor may be speed dependent. The integral term may further comprise an integral factor (gain) multiplied with the integral of the function. The integral factor is suitably speed dependant. The step of determining s102 the braking value may thus comprise to determine an integral factor based on the current vehicle speed. The integral factor may increase linearly when the vehicle speed decreases from 10 km/h to 0 km/h. The second input value correlated to the current braking value may be the integral term, the integral term plus the proportional term or the current braking value after limitation as described in FIG. 2. The PI controller is described more in detail in relation to FIG. 2.

The step of determining s102 the braking value may further comprise to determine the function based on the value and/or the direction of the first input value in relation to the second input value. Thus, the step of determining s102 the braking value may further comprise to determine the function based on the value and/or the direction of the operator input torque or the applied motor torque, in relation to the second input value. The step of determining s102 the braking value may comprise comparing the sign of the first input value with the sign of the second input value. The step of determining s102 the braking value may also comprise comparing the value of the first input value with predetermined threshold values. How the function is determined is further described in relation to FIG. 4.

The step of identifying s101 a need for steering support may be performed based on the operator input torque. Identifying s101 a need for steering support may comprise to determine that there is a failure in a steering aid system in the vehicle 1. The operator input torque may indicate if there is a need for steering support since the operator typically is required to apply more torque when there is something wrong with the steering aid systems. The step of identifying s101 a need for steering support may thus comprise to determine the operator input torque. According to an example identifying s101 a need for steering support comprises to determine if the operator input torque has exceeded a predetermined maximum torque value during a predetermined time. Suitably, the method comprises to determine if the operator input torque has exceeded a predetermined maximum torque value during a predetermined time, at a vehicle speed above 7 km/h. When the operator input torque has exceeded the predetermined maximum torque value for a certain period in time it can be concluded that something is wrong with a steering aid system (for example the servomechanism).

In the case where the vehicle 1 comprises an electronically assisted steering system 404, the step of identifying s101 a need for steering support may be based on the applied motor torque. Identifying s101 a need for steering support may be based on a measured operator input torque, a measured motor torque and/or a faulty signal indicating failure with a steering aid system. According to an example identifying s101 a need for steering support comprises controlling that a measured operator input torque and a measured motor torque are consistent with each other.

The step of identifying s101 a need for steering support must be performed before determining s102 the braking value. If a need for steering support is identified s101, the steps of determining s102 the braking value and controlling s103 the braking system are activated. If no need for steering support is identified, the rest of the method steps will not be performed.

The method may further comprise to determine if the difference between the current wheel angle and a wheel angle defining a wheel position in parallel with the longitudinal extension of the vehicle is smaller than a predetermined angle value. A wheel angle defining a wheel position in parallel with the longitudinal extension of the vehicle may be referred to as a zero angle. If the difference is larger than the predetermined angle value and the operator wants to turn the wheels further in the same direction, the steering support will be interrupted. Suitably, if the current wheel angle is close to a maximum wheel angle and the operator intends to turn the wheels further in the same direction, the steering aid will not support that. The maximum wheel angle is the largest possible wheel angle. This way, the risk for damaging mechanical components of the wheel suspension is reduced. The predetermined angle value may be 5-10% smaller than the difference between the maximum wheel angle and the zero angle. If the difference is smaller than the predetermined angle value the steering support is provided.

The method may comprise to limit the vehicle speed/driveline torque of the vehicle 1 when a need for steering support has been identified.

The method may also comprise to determine distribution of the braking value between the vehicle wheels 6. The method may comprise to determine distribution of the braking value between the wheels of the steered and the not steered axles of the vehicle. The method may comprise to determine distribution of the braking value based on the configuration of the braking system 300; the current vehicle speed and/or if the determined braking value is close to a maximum brake pressure. For example, the braking value may not be distributed to easily overheated axles 4. At higher vehicle speeds a first steered axle 4 may not be braked but instead the braking value is doubled and distributed to a second steered axle 4. At low vehicle speeds the risk for wheel lockup increases and the braking value may therefore be distributed between all front steered axles 4 at low vehicle speeds. If the determined braking value is close to a maximum brake pressure also the rigid (rear) axles 4 may be braked. Suitably, the method comprises to determine if the determined braking value exceeds a predetermined brake pressure threshold value, and if so distribute the braking value also to the rigid axles 4 of the vehicle 1. The predetermined brake pressure threshold value may be between 80-90% of the maximum brake pressure. This way, it is ensured that the desired steering support is provided. The step of determining the distribution of the braking value results in at least one distributed braking value adapted to control the braking system 300.

The step of determining the distribution of the braking value may comprise a scale factor for reducing the braking value adapted for the left side of the vehicle for vehicles where braking the left wheel has a greater steering impact than braking the right wheel (left oversteered) and for reducing the braking value adapted for the right side of the vehicle for vehicles where braking the right wheel has a greater steering impact than braking the left wheel (right oversteered). The scale factor may be between 75-95%. The method may comprise to multiply the braking value adapted for left wheels with a scale factor if the vehicle 1 is left oversteered and multiplying the braking value adapted to right wheels with a scale factor if the vehicle 1 is right oversteered.

The step of controlling s103 the braking system 300 based on the determined braking value suitably comprises to send at least one control signal comprising the distributed braking value to the braking system 300. The at least one control signal suitably indicates the braking force/brake pressure to be applied and on which side of the vehicle 1. The at least one control signal may be transferred to the braking system 300 via the at least one interface allowing individual braking of the wheels 6. The step of controlling s103 the braking system 300 may be based on the determined braking value and the current vehicle speed.

The method may comprise to set the distributed braking value to zero if the absolute value of the determined braking value is lower than a minimum threshold value. Thus, the at least one control signal may be set to zero, such that no braking is performed, when the absolute value of the determined braking value is lower than a minimum threshold value. The minimum threshold value may be around 10% of the maximum brake pressure.

The method may further comprise providing an alert regarding the provided steering support. The alert to the operator may be provided via an information cluster 600. The information may be in the form of an audial alert, visual alert on a display or a haptic alert.

Figure 4:
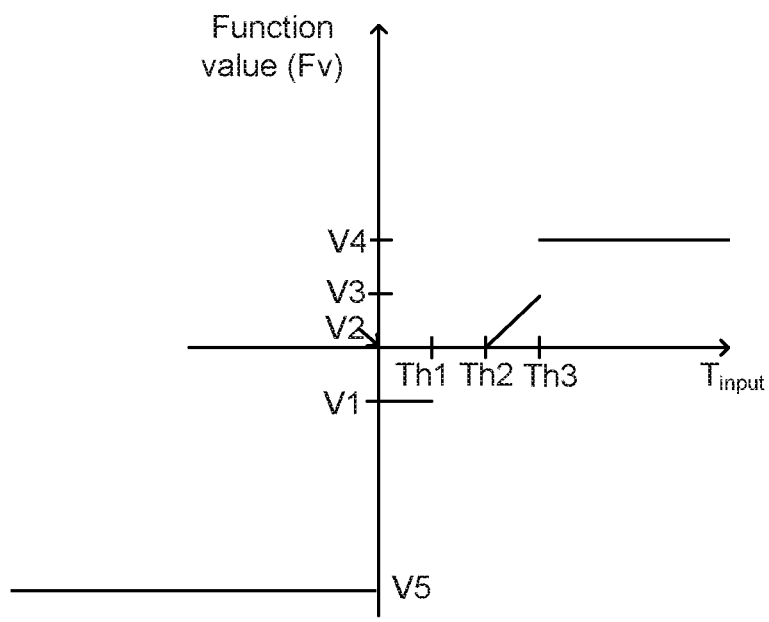
FIG. 4 illustrates diagrams of an input conversion function according to an embodiment of the invention.
Figure 4:
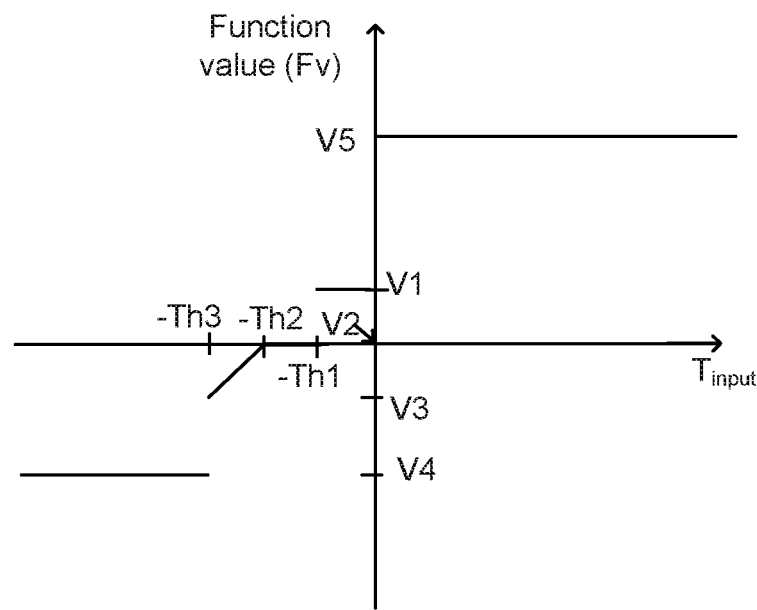

FIG. 4 shows diagrams of an input conversion function according to an embodiment of the invention. As disclosed in relation to FIG. 2 and FIG. 3, the system 100 is adapted to determine the function value Fv based on the value and direction of the first input value (operator input torque or motor torque) $T_{input}$ in relation to the second input value that is correlated to the current braking value. The first input value $T_{input}$ is also compared to predetermined torque thresholds. These diagrams illustrate an example of how the function value Fv is determined in the regulation module 140 of the system 100. This example is applicable in cases where the input signal to the regulation module 140 is positive or negative depending on the direction of the applied torque. The input signal is normalized to a range between −1 to +1 and the first input value $T_{input}$ is thus a value between −1 to +1. In this example, for convenience the function value Fv is shown in separate diagrams depending on the sign of the second input value.

When the first input value $T_{input}$ has the same sign (direction) as the second input value (representing current braking value), the function value Fv is set to a first value V1 if the absolute value of the first input value $T_{input}$ is below a first threshold value Th1. The first value V1 suitably has a different sign than the second input value. This way, the steering wheel will return to a mid-position when the operator lets go of the steering wheel. The absolute value of the first value V1 may for example be 0.5. The first threshold value Th1 may be 0.1.

When the first input value $T_{input}$ has the same sign (direction) as the second input value, the function value Fv may be set to a second value V2 if the absolute value of the first input value $T_{input}$ is between the first threshold value Th1 and a second threshold value Th2. In this example the second value V2 may be zero. For positive second input values the second value V2 is higher than the first value V1, for negative second input values the value of V2 is lower than the first value V1. The second threshold value Th2 may be 0.5.

When the first input value $T_{input}$ has the same sign (direction) as the second input value, the function value Fv may be set to increase its absolute value between the second value V2 and a third value V3 when the absolute value of the first input value $T_{input}$ is between the second threshold value Th2 and a third threshold value Th3. As an example, with positive second input value, the third value V3 may be 0.5. In case the second input value is zero, it is not until first input value $T_{input}$ has an absolute value greater than Th2 that the new second input value will get a different value than zero.

The third threshold value Th3 may correspond to a value just below the highest possible measurement value for the means 400 for determining the operator input torque. That is, the third threshold value may be just below the maximum value of the measurement range for the means 400 for determining the operator input torque. The third threshold value Th3 may be 0.9, corresponding to a torque of about 10 Nm for a maximum torque measurement range of 11.2 Nm.

When the first input value $T_{input}$ has the same sign (direction) as the second input value, the function value Fv may be set to a fourth value V4 when the absolute value of the first input value $T_{input}$ exceeds the third threshold value Th3. The absolute value of the fourth value V4 is higher than the absolute value of the third value V3 and has the same sign as the second input value. Suitably, the absolute value of the fourth value V4 is significantly higher than the absolute value of the third value V3. As an example with positive second input value, the fourth value V4 is 1. This way, a brake pressure can rapidly be built up when the absolute value of the first input value $T_{input}$ exceeds the third threshold value Th3.

The function value Fv may be set to a fifth value V5, when the sign of the first input value $T_{input}$ is opposite to the sign of the second input value. When the first input value $T_{input}$ and the second input value have different signs the operator desires to turn the vehicle in an opposite direction and wheel brakes on the currently braked side should be quickly released with the rate of V5. Eventually the brakes at the currently braked side are released and if the manoeuvre continues, the brakes on the other side of the vehicle 1 will be activated. As pressure builds up on the new side, the first input value $T_{input}$ and the second input value will again have the same sign if the manoeuvre continues. By using different function values Fv depending on the value and sign of the first input value $T_{input}$ in relation to the second input value, the determined braking value is accurately adapted to the current conditions and a very responsive system 100 is achieved. The fifth value V5 is given opposite sign (direction) as the second input (current braking) value. The absolute value of V5 is suitably larger than the absolute value of V4. In this example, with positive second input value, the first input value $T_{input}$ has turned negative and the fifth value V5 is −3. This way, the brake pressure of the currently activated wheel brakes can rapidly be decreased and steering support to the desired direction can thereby be provided faster.

Figure 5:
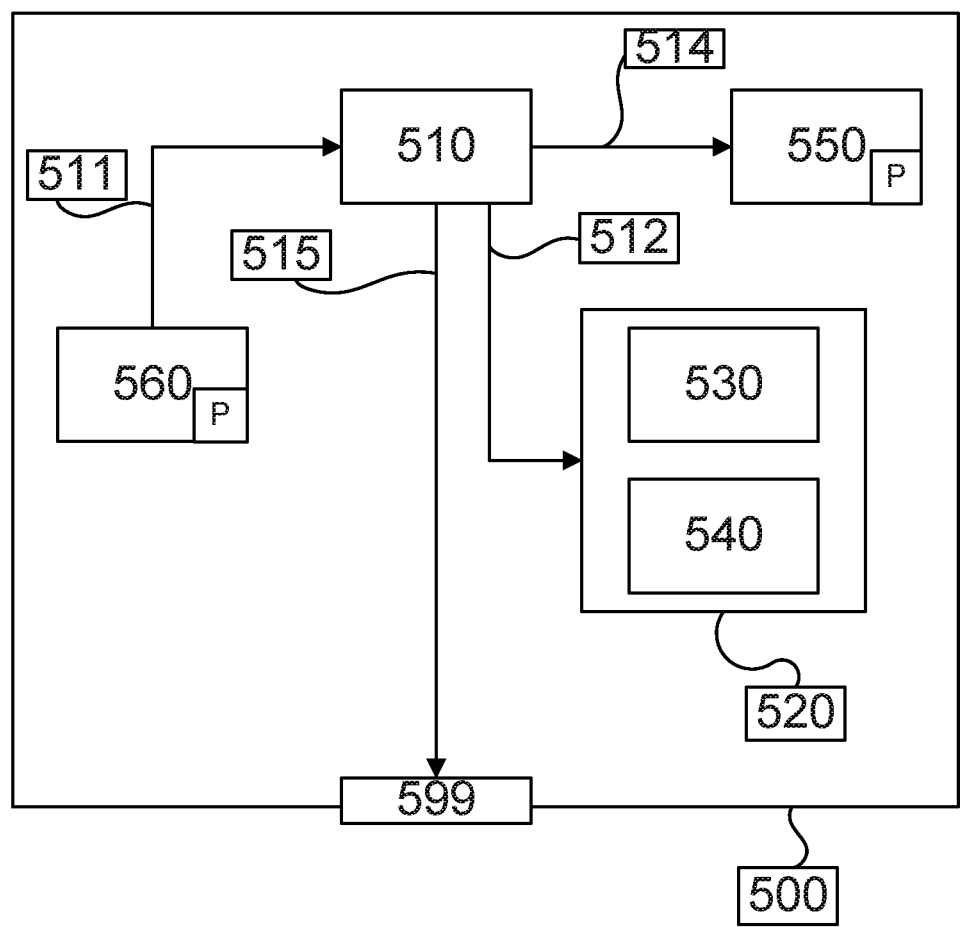
FIG. 5 schematically illustrates a control unit or computer according to an embodiment of the invention.

FIG. 5 is a diagram of a version of a device 500. The control unit 110 described with reference to FIG. 2 may in a version comprise the device 500. The term "link" refers herein to a communication link which may be a physical connection such as an optoelectronic communication line, or a non-physical connection such as a wireless connection, e.g. a radio link or microwave link. The device 500 comprises a non-volatile memory 520, a data processing unit 510 and a read/write memory 550. The non-volatile memory 520 has a first memory element 530 in which a computer programme, e.g. an operating system, is stored for controlling the function of the device 500. The device 500 further comprises a bus controller, a serial communication port, I/O means, an A/D converter, a time and date input and transfer unit, an event counter and an interruption controller (not depicted). The non-volatile memory 520 has also a second memory element 540.

There is provided a computer programme P which comprises routines for identifying a need for steering support. The computer programme P comprises routines for determining a braking value required for achieving the needed steering support, based on an integration of a function of at least one input value relating to a determined or estimated operator input torque. The computer programme P comprises routines for controlling a braking system based on the determined braking value. The computer programme P comprises routines for determining the distribution of the braking value between the wheels of a vehicle. The computer programme P comprises routines for determining the braking value by means of a PI controller, wherein the integral term comprises integration of a function of a first input value relating to a determined or estimated operator input torque and a second input value correlated to a current braking value.

The programme P may be stored in an executable form or in a compressed form in a memory 560 and/or in a read/write memory 550.

Where the data processing unit 510 is described as performing a certain function, it means that the data processing unit 510 effects a certain part of the programme stored in the memory 560 or a certain part of the programme stored in the read/write memory 550.

The data processing device 510 can communicate with a data port 599 via a data bus 515. The non-volatile memory 520 is intended for communication with the data processing unit 510 via a data bus 512. The separate memory 560 is intended to communicate with the data processing unit 510 via a data bus 511. The read/write memory 550 is adapted to communicating with the data processing unit 510 via a data bus 514.

When data are received on the data port 599, they are stored temporarily in the second memory element 540. When input data received have been temporarily stored, the data processing unit 510 is prepared to effect code execution as described above.

Parts of the methods herein described may be effected by the device 500 by means of the data processing unit 510 which runs the programme stored in the memory 560 or the read/write memory 550. When the device 500 runs the programme, methods herein described are executed.

The foregoing description of the preferred embodiments of the present invention is provided for illustrative and descriptive purposes. It is not intended to be exhaustive or to restrict the invention to the variants described. Many modifications and variations will obviously be apparent to one skilled in the art. The embodiments have been chosen and described in order best to explain the principles of the invention and its practical applications and hence make it possible for specialists to understand the invention for various embodiments and with the various modifications appropriate to the intended use.

The invention claimed is:

1. A method for providing vehicle steering support by differential wheel braking, the vehicle comprising:
at least two axles with at least two wheels per axle;

a braking system allowing individual braking of the wheels; and means for determining and/or estimating an operator input torque applied to a steering wheel of the vehicle, wherein the vehicle is configured with a positive scrub radius, wherein the method comprising:

identifying a need for steering support;

receiving a first input value relating to the determined or estimated operator input torque applied to the steering wheel of the vehicle;

receiving a second input value correlated to a current braking value representing an amount of braking currently being applied to at least one wheel of the vehicle;

calculating a determined braking value correlating to an amount of braking to be applied to at least one wheel of the vehicle for achieving a needed steering support, wherein calculating the determined braking value comprises using a proportional-integral controller, wherein an integral term used by the controller comprises integration of a function of the first input value relating to the determined or estimated operator input torque applied to the steering wheel of the vehicle and the second input value correlated to the current braking value representing the amount of braking currently being applied to at least one wheel of the vehicle; and controlling the braking system based on the determined braking value.

2. The method according to claim 1, wherein a need for steering support is identified only if a current vehicle speed is above 7 km/h.

3. The method according to claim 1, further comprising determining if a difference between the current wheel angle and a wheel angle defining a wheel position in parallel with the longitudinal extension of the vehicle is less than a predetermined wheel angle value.

4. The method according to claim 1, wherein the integral term and/or a proportional term used by the controller each comprises a factor, which is vehicle speed dependent.

5. The method according to claim 4, wherein the factor may increase linearly with decreasing vehicle speed, for vehicle speeds below 15 km/h.

6. The method according to claim 1, wherein the function is based on a value and/or a direction of the first input value in relation to the second input value.

7. The method according to claim 6, wherein, the function value is set to a first value when the first input value has the same sign as the second input value and its absolute value is below a first threshold value, wherein the first value has a different sign than the first input value.

8. The method according to claim 7, wherein the function value is set to a second value when the first input value has the same sign as the second input value and its absolute value is between the first threshold value and a second threshold value.

9. The method according to claim 8, wherein the absolute value of the function value increases between the second value and a third value when the first input value has the same sign as the second input value and its absolute value is between the second threshold value and a third threshold value, wherein the third value has the same sign as the first input value.

10. The method according to claim 9, wherein the function value is set to a fourth value when the first input value has the same sign as the second input value and its absolute value exceeds the third threshold value, the absolute value of the fourth value being higher than the absolute value of the third value, wherein the fourth value has the same sign as the first input value.

11. The method according to claim 10, wherein the function value is set to a fifth value when the first input value has opposite sign compared to the second input value, wherein the fifth value has the same sign as the first input value and its absolute value is higher than the absolute value of.

12. The method according to claim 1, wherein the determined braking value further indicates on which side of the vehicle the determined braking value should be applied.

13. The method according to claim 1, further comprising determining distribution of the determined braking value between the vehicle wheels.

14. The method according to claim 13, wherein the distribution is determined based on at least one of the: configuration of the brake system, the current vehicle speed, and/or if the determined braking value is substantially equal to a maximum brake pressure.

15. The method according to claim 13, wherein determining the distribution comprises a scale factor for reducing a braking value adapted for left wheels for vehicles that are more easily steered by brake on the left side and for reducing a braking value adapted for right wheels for vehicles that are more easily steered by brake on the right side.

16. The method according to claim 1, wherein the braking system is controlled based on the determined braking value and the current vehicle speed.

17. The method according to claim 1, wherein a braking value used for controlling the braking system is set to a value of zero if the absolute value of the determined braking value is lower than a minimum threshold value.

18. The method according to claim 1, wherein the second input value correlates to a current braking value indicating a current brake pressure applied to at least one brake of the braking system.

19. The method according to claim 1, wherein the determined braking value is one of a percentage value of a maximum brake pressure or a brake pressure value.

20. A computer program product comprising computer program code stored on a non-transitory computer-readable medium, said computer program product used for providing vehicle steering support by differential wheel braking, where the vehicle comprises at least two axles with at least two wheels per axle; a braking system allowing individual braking of the wheels; and means for determining and/or estimating an operator input torque applied to a steering wheel of the vehicle, wherein the vehicle is configured with a positive scrub radius, said computer program code comprising computer instructions to cause one or more control units to perform the following operations:

identifying a need for steering support;

receiving a first input value relating to the determined or estimated operator input torque applied to the steering wheel of the vehicle;

receiving a second input value correlated to a current braking value representing an amount of braking currently being applied to at least one wheel of the vehicle;

calculating a determined braking value correlating to an amount of braking to be applied to at least one wheel of the vehicle for achieving a needed steering support, wherein calculating the determined braking value comprises using a proportional-integral controller, wherein an integral term used by the controller comprises integration of a function of the first input value relating to the determined or estimated operator input torque applied to the steering wheel of the vehicle and the second input value correlated to the current braking value representing the amount of braking currently being applied to at least one wheel of the vehicle; and controlling the braking system based on the determined braking value.

21. A system for providing steering support by differential wheel braking in a vehicle, the vehicle comprising at least two axles with at least two wheels per axle, and being configured with a positive scrub radius, wherein the system is arranged in communication with a braking system of the vehicle, the braking system allowing individual braking of the wheels, and wherein the system is arranged in communication with means for determining and/or estimating an operator input torque applied to a steering wheel of the vehicle, wherein the system comprises:
  means for identifying a need for steering support;
  means for receiving a first input value relating to the determined or estimated operator input torque applied to the steering wheel of the vehicle;
  means for receiving a second input value correlated to a current braking value representing an amount of braking currently being applied to at least one wheel of the vehicle;
  means for calculating a determined braking value correlating to an amount of braking to be applied to at least one wheel of the vehicle for achieving a needed steering support, wherein calculating the determined braking value comprises using a proportional-integral controller, wherein an integral term used by the controller comprises integration of a function of the first input value relating to the determined or estimated operator input torque applied to the steering wheel of the vehicle and the second input value correlated to the current braking value representing the amount of braking currently being applied to at least one wheel of the vehicle; and
  means for controlling the braking system based on the determined braking value.

22. The system according to claim 21, further comprising an interface for communication with the brake system.

23. The system according to claim 21, further comprising means for determining distribution of the determined braking value between the vehicle wheels.

24. The system according to claim 21, wherein the system is arranged in communication with an instrument cluster and wherein the system is adapted to inform an operator of the vehicle about the provided steering support via the instrument cluster.

25. The system according to claim 21, wherein the system is adapted to ensure that the vehicle speed is reduced when the need for steering support has been identified.

26. A method for providing vehicle steering support by differential wheel braking, the vehicle comprising:
  at least two axles with at least two wheels per axle;
  a braking system allowing individual braking of the wheels; and
  means for determining and/or estimating an operator input torque applied on a steering wheel, wherein the vehicle is configured with a positive scrub radius;
  the method comprising:
    identifying that there is a need for steering support when the operator input torque exceeds a predetermined maximum torque value during a predetermined period of time;
    determining a braking value required for achieving the needed steering support based on an integration of a function of at least one input value related to the determined or estimated operator input torque; and
    controlling the braking system based on the determined braking value.

* * * * *